United States Patent
Bruton et al.

(10) Patent No.: US 11,891,700 B2
(45) Date of Patent: *Feb. 6, 2024

(54) COLD SPRAY METALLIC COATING AND METHODS

(71) Applicant: THE BOEING COMPANY, Chicago, IL (US)

(72) Inventors: Eric A. Bruton, St. Louis, MO (US); Stephen P. Gaydos, St. Louis, MO (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,602

(22) Filed: Oct. 18, 2022

(65) Prior Publication Data

US 2023/0047638 A1    Feb. 16, 2023

Related U.S. Application Data

(63) Continuation of application No. 16/215,386, filed on Dec. 10, 2018, now Pat. No. 11,492,708.

(60) Provisional application No. 62/623,268, filed on Jan. 29, 2018.

(51) Int. Cl.
| | | |
|---|---|---|
| *C23C 24/04* | (2006.01) | |
| *B64C 1/00* | (2006.01) | |
| *C23C 28/00* | (2006.01) | |
| *B05D 1/12* | (2006.01) | |

(Continued)

(52) U.S. Cl.
CPC ............. *C23C 24/04* (2013.01); *B05D 1/12* (2013.01); *B05D 7/02* (2013.01); *B05D 7/54* (2013.01); *B64C 1/00* (2013.01); *C23C 28/00* (2013.01); *C23C 28/321* (2013.01); *C23C 28/322* (2013.01); *C23C 28/341* (2013.01);
(Continued)

(58) Field of Classification Search
CPC .. C23C 24/04; B05D 1/12; B05D 7/02; B05D 7/54
See application file for complete search history.

(56) References Cited

U.S. PATENT DOCUMENTS

| | | | |
|---|---|---|---|
| 4,390,487 A | 6/1983 | Segal | |
| 4,390,489 A | 6/1983 | Segal | |
| 4,769,270 A | 9/1988 | Nagamatsu et al. | |

(Continued)

FOREIGN PATENT DOCUMENTS

| | | | |
|---|---|---|---|
| EP | 3401419 A1 | 11/2018 | |
| WO | 2019148162 A1 | 8/2019 | |

OTHER PUBLICATIONS

Extended European Search Report dated Jan. 26, 2021 in related European Application No. 20180711.2, 12 pages.

(Continued)

*Primary Examiner* — Nathan T Leong
(74) *Attorney, Agent, or Firm* — MH2 Technology Law Group LLP (57) ABSTRACT

The present disclosure relates to a cold spray metal process for imparting electromagnetic interference (EMI) resistance or lightning protection to the surface of a polymer, and a polymer with surface EMI resistance, or lightning protection, articles coated therefrom, and methods of reducing or eliminating electrochemical interactions between the metallic coating and components of the polymer.

20 Claims, 5 Drawing Sheets

(51) Int. Cl.
*B05D 7/02* (2006.01)
*B05D 7/00* (2006.01)

(52) U.S. Cl.
CPC ........ *C23C 28/345* (2013.01); *C23C 28/3455* (2013.01); *B05D 2201/00* (2013.01)

(56) References Cited

U.S. PATENT DOCUMENTS

| | | |
|---|---|---|
| 5,127,601 A | 7/1992 | Schroeder |
| 5,246,538 A | 9/1993 | Johnson |
| 5,302,414 A | 4/1994 | Alkhimov et al. |
| 6,129,948 A | 10/2000 | Plummer et al. |
| 7,354,354 B2 | 4/2008 | Palumbo et al. |
| 8,119,531 B1 | 2/2012 | Arnold et al. |
| 2004/0058064 A1 | 3/2004 | Fuller et al. |
| 2006/0093736 A1 | 5/2006 | Raybould et al. |
| 2006/0135282 A1 | 6/2006 | Palumbo et al. |
| 2007/0175573 A1 | 8/2007 | Fox et al. |
| 2008/0145555 A1 | 6/2008 | Kocik et al. |
| 2009/0029180 A1 | 1/2009 | Oguri et al. |
| 2010/0040902 A1 | 2/2010 | Mizrahi |
| 2010/0119707 A1 | 5/2010 | Raybould et al. |
| 2010/0304063 A1 | 12/2010 | McCrea et al. |
| 2011/0039024 A1 | 2/2011 | Jabado et al. |
| 2011/0135884 A1 | 6/2011 | Lettow et al. |
| 2011/0159764 A1 | 6/2011 | Price et al. |
| 2012/0037449 A1 | 2/2012 | Ayle |
| 2012/0125660 A1 | 5/2012 | Bright |
| 2013/0095340 A1 | 4/2013 | Sivakumar et al. |
| 2014/0141257 A1* | 5/2014 | Ranade .................. C23C 4/12 428/688 |
| 2017/0165906 A1* | 6/2017 | Alms ..................... B32B 15/20 |
| 2018/0186460 A1 | 7/2018 | Dardona et al. |
| 2018/0233981 A1 | 8/2018 | Yin et al. |
| 2019/0233946 A1 | 8/2019 | Bruton et al. |
| 2020/0032010 A1 | 1/2020 | Liao et al. |
| 2020/0399763 A1 | 12/2020 | Bruton et al. |
| 2021/0176904 A1 | 6/2021 | Su |
| 2023/0050236 A1 | 2/2023 | Chen et al. |
| 2023/0086889 A1 | 3/2023 | Bruton et al. |
| 2023/0212756 A1 | 7/2023 | Bruton et al. |

OTHER PUBLICATIONS

Zhou et al., "Preparation of Metallic Coatings on Polymer Matrix Composites by Cold Spray," Surface and Coating Technology 206 (2011) 132-136.
Notification Concerning Transmittal of International Preliminary Report on Patentability dated Aug. 13, 2020 in corresponding PCT Application No. PCT/US2019/015558, 10 pages.
Wikipedia "Thermal Spraying,," author unknown, retrieved from "https://en.wikipedia.org/w/index.php?title=Thermal_spraying&oldid=89396788" 5, last edited on Apr. 24, 2019, 8 pages.
Bruton et al., "Cold Spray Metallic Coating and Methods," U.S. Appl. No. 16/215,386, filed Dec. 10, 2018.
Che et al., "Metallization of carbon fibre reinforced polymers by cold spray," Surface & Coatings Technology 313 (2017) 236-247.
Tsipouridis, (Authorized Officer), International Search Report and Written Opinion dated Apr. 11, 2019 issued in related International Application No. PCT/US2019/015558 filed Jan. 29, 2019.
Ganesan, A., et al., "Cold Spray Coating Deposition Mechanism on the Thermoplastic and Thermosetting Polymer Substrates," Journal of Thermal Spray Technology, Asm International, Dec. 2013 (revised Jul. 7, 2013), 22(8): 1275-1282, 8 pages.
Author Unknown, Thermcraft, Inc., "Electrical Resistance Heating Elements: An Overview," 2016, 30 pages.
Chatron-Michaud, P. (EP Examiner), Extended European Search Report for European Application No. 23159642.0 dated Jul. 6, 2023, 7 pages.
Bruton et al., "Cold Sprayed Electrical Circuits and Methods Thereof," U.S. Appl. No. 17/653,333, filed Mar. 3, 2022, 35 pages.
Bruton et al., Composite Laminates with Metal Layers and Methods Thereof, U.S. Appl. No. 17/653,336, filed Mar. 3, 2022, 30 pages.
Hillebrand, Gerhard (EP Examiner), Extended European Search Report for European Application No. 23159607.3 dated Jun. 19, 2023, 6 pages.
Dielectric Manufacturing, "Kapton (R) (Unfilled Polyimide)," Product Sheet, Apr. 1, 2023, 3 pages.

* cited by examiner

COLD SPRAY METALLIC COATING AND METHODS

CROSS-REFERENCE TO RELATED APPLICATIONS

This application is a continuation of U.S. application Ser. No. 16/215,386, filed Dec. 10, 2018, now allowed as U.S. Pat. No. 11,492,708, which claims the benefit of U.S. Provisional Application No. 62/623,268, filed Jan. 29, 2018 which are incorporated herein by reference in their entireties.

TECHNICAL SUMMARY

The present disclosure relates to a process for imparting electromagnetic interference ("EMI") resistance or lightning protection to the surface of a polymer, and a polymer with surface EMI resistance or lightning protection as well as reducing or eliminating electrochemical interactions between components of the polymer and a metallic coating placed thereon.

BACKGROUND

Metallic aircraft encountering lightning, conduct the imposed electric current across the skin of the aircraft, in most cases suffering little resultant effect. With the increased use of composite materials like graphite epoxies and other fiber reinforced plastics (FRP), resistive conductors, that inhibit current conductance, exposure has an effect. For example, a graphite FRP composite can absorb nearly 2,000 times the energy absorbed compare to the same mass of aluminum. The intense current density of a lightning strike can vaporize or "puncture" the thin composite laminates of FRP of such aircraft. Once such penetration occurs further effects and physical effects may result. Other types of apertures or seams in the FRP assemblage may also provide access to electromagnetic energy.

Examples of a known process for imparting EMI resistance or lightning protection to the surface of a composite material involves a technique in which a metal (copper) foil is subjected to heated adhesion forming at the same time as the forming of the composite material, or by the deposition of metallic layers on the FRP. Galvanic and other electrochemical interactions require maintenance and inspection of the FRP and/or the need for replacement of the FRP and its metallic coating, which is time-consuming and expensive.

SUMMARY

In one example, a method of reducing or eliminating at least one electrochemical interaction between a metallic coating and a polymer is provided, the method comprising: introducing particles of a metal powder or metal alloy powder or a mixture of the metal powder and the metal alloy powder to a gas stream; directing the gas stream toward an electrochemical insulating layer present on a surface of a polymer, wherein the gas stream has a temperature and pressure adjusted to prevent thermal softening or ablation of the surface of the electrochemical insulating layer; forming a metallic coating on at least a portion of the electrochemical insulating layer; and reducing or eliminating electrochemical interaction between the metallic coating and the polymer.

In another example, the temperature of the gas stream is between 100° C. and 500° C. in yet another example, alone or in combination with any of the previous examples, the pressure of the gas stream is between 100 psi and 400 psi.

In another example, alone or in combination with any of the previous examples, the polymer is a crystalline polymer, a semi-crystalline polymer, or an amorphous polymer.

In another example, alone or in combination with any of the previous examples, the electrochemical insulating layer is non-conductive.

In another example, alone or in combination with any of the previous examples, the method further comprises introducing an additional metallic layer on at least a portion of the metallic coating, the additional metallic layer being compositionally different from the metallic coating. In another example, alone or in combination with any of the previous examples, the additional metallic layer is cold or thermal sprayed. In another example, alone or in combination with any of the previous examples, the additional metallic layer is selected from Ag, Au, Co, Cr, Cu, Fe, Ni, Mo, Pd, Pt, Rh, Ru, Sn, Ti, W, Zn, Zr, or alloys thereof. In another example, alone or in combination with any of the previous examples, the additional metallic layer comprises cold or thermal sprayed nickel.

In another example, alone or in combination with any of the previous examples, the gas stream comprises one or more of air, nitrogen, or a mixture thereof. In another example, alone or in combination with any of the previous examples, at least a portion of the polymer comprises carbon or glass reinforced PEKK or PEEK. In another example, alone or in combination with any of the previous examples, the insulating layer is paint.

In one example, the metal powder consists essentially of aluminum powder or aluminum alloy powder, the temperature of the gas stream is between 100° C. and 500° C., the gas stream comprises air at a pressure between 100 psi and 400 psi, and the polymer comprises a carbon fiber or glass fiber reinforced poly-ether-ether-ketone (PEEK) or poly-ether-ketone-ketone (PEKK). In another example, the metal powder consists essentially of aluminum powder, the temperature of the gas stream is between 100° C. and 500° C., the gas stream comprises air at a pressure between 100 psi and 400 psi, and the polymer comprises a carbon fiber or glass fiber reinforced poly-ether-ether-ketone (PEEK) or poly-ether-ketone-ketone (PEKK), and the additional metallic layer comprises nickel.

In a second example, a method of imparting electromagnetic interference shielding, electromagnetic emission shielding, or lightning strike protection to a conductive formed article is provided, the method comprising: cold spraying an aluminum layer onto at least a portion of a surface of a formed article comprising carbon fiber or glass fiber reinforced poly-ether-ether-ketone (PEEK) or poly-ether-ketone-ketone (PEKK); imparting electrical EMI resistance or lightning protection, electromagnetic interference shielding, electromagnetic emission shielding, or lightning strike protection to the formed article.

In one example, the formed PEKK or PEEK comprises an electrochemical insulating layer on the surface. In another example, the formed PEKK or PEEK comprises a nonconductive electrochemical insulating layer on the surface.

In another example, alone or in combination with any of the previous examples, the method further comprises cold or thermal spray coating onto the aluminum coating at least one metallic layer different from aluminum. In another example, alone or in combination with any of the previous examples, the at least one additional metallic layer is selected from Ag, Au, Co, Cr, Cu, Fe, Ni, Mo, Pd, Pt, Rh, Ru, Sn, Ti, W, Zn, Zr, or alloys thereof.

In another example, alone or in combination with any of the previous examples, at least a portion of the formed article comprises one or more fillers or reinforcement materials of carbon nanotubes, graphite, carbon fibers, graphite fibers, fiberglass, glass fibers, metals, metal alloys, metalized fibers, and metal coated glass fibers.

In another example, alone or in combination with any of the previous examples, the temperature of the gas stream is between 100° C. and 500° C. and wherein the pressure of the gas stream is between 100 psi and 400 psi.

In a third example, a cold sprayed metal coated article as provided, the article comprising: a polymeric material having at least one surface; an electrochemical insulating layer on the at least one surface; and a cold sprayed aluminum or aluminum alloy coating present on the electrochemical insulating layer; optionally at least one additional conductive layer, the at least one additional layer sandwiching at least a portion of the aluminum or aluminum alloy coating between the additional layer and the electrochemical insulating; the cold sprayed metal coated article having one or more of electromagnetic interference shielding, electromagnetic emission shielding, or lightning strike protection.

In another example, alone or in combination with any of the previous examples, the at least one additional conductive layer is selected from Ag, Au, Co, Cr, Cu, Fe, Ni, Mo, Pd, Pt, Rh, Ru, Sn, Ti W, Zn, Zr, or alloys thereof. In another example, alone or in combination with any of the previous examples, the polymeric material comprises epoxy, phenolic, polyesters, polyester, urea, melamine, polyamides, polyimides, poly-ether-ether-ketones (PEEK), poly-ether-ketone-ketones (PEKK), polyphthalamides, polyphtalates, polysulfones, polyurethanes, chlorinated polymers, fluorinated polymers, polytetrafluoroethylene, polycarbonates, liquid crystal polymers, partially crystalline aromatic polyesters, and modified versions thereof containing one or more fillers or reinforcement materials comprising carbon, carbon nanotubes, graphite, carbon fibers, graphite fibers, fiberglass, glass fibers, metals, metal alloys, metalized fibers and metal coated glass fibers.

In another example, alone or in combination with any of the previous examples, the article is a component or part of an aerospace vehicle.

In a fourth example, a polymer or thermoplastic composite material is provided for improved UV resistance by the application of a cold sprayed metal as disclosed herein. In a fifth example, painting and/or coating of a polymer or thermoplastic composite material is improved by the application of a cold sprayed metal as disclosed herein.

DETAILED DESCRIPTION

In order to achieve the above examples, a process for imparting electromagnetic interference shielding, electromagnetic emission shielding, lightning strike protection, electrochemical interaction resistance, or combinations thereof to a surface of a polymer according to the present disclosure comprises a step of projecting metal particles, using a cold spraying method, onto at least a portion of the surface of a polymer, thereby forming a metallic coating.

In this process, metal particles are projected onto the surface of a polymer to form a metallic coating with excellent adhesion, thereby imparting electromagnetic interference shielding, electromagnetic emission shielding, or lightning strike protection to the polymer. The metallic coating can be continuous on the surface of the polymer. The metallic coating can be semi-continuous on the surface of the polymer. The metallic coating can be patterned on the surface of the polymer using conventional masking techniques. This polymer with surface EMI resistance, lightning protection or electrochemical interaction resistance is produced using a technique in which metal particles are projected directly onto the surface of a polymer, and a metallic coating that exhibits excellent adhesion is provided.

Furthermore, a polymer with surface electromagnetic interference shielding, electromagnetic emission shielding, lightning strike protection or combinations thereof according to the present disclosure is a structure comprising a polymer that comprises an electrochemical insulating layer, and a metallic coating formed by a cold spraying method on at least a portion of the surface of the electrochemical insulating layer.

As used herein, "alloy" means a substance composed of two or more metals or a metal and a nonmetal intimately united usually by being fused together and dissolved in each other when molten.

As used herein, "cold sprayed metal" coating refers to a coating of metal layer formed via a deposition method where solid metal particles are accelerated in a gas stream to velocities capable of providing plastic deformation of the metal particles during impact with the substrate and providing and adherence of the metal particles to the substrate surface. Cold spray metal coating avoids melting of the metal particles during the spraying process.

As used herein, "thermal sprayed metal" coating refers to a metal layer formed via a coating processes in which melted (or heated near the melting point) metal are sprayed onto a substrate surface. The metal feedstock is typically particles heated by electrical (e.g., plasma or arc) or chemical (e.g., combustion flame) processes.

As used herein, the phrase "electrochemical insulating layer" means a substance that prevents or eliminates electrochemical interactions between materials separated therefrom. Electrochemical interactions include oxidation-reduction reactions between materials and chemical reactions caused by an externally supplied current. Exemplary electrochemical interactions include, but are not limited to, galvanic and/or oxidation-reduction interactions of metal of the metallic layer present on fiber reinforced plastics with one or more components of fiber reinforced plastics. In one aspect, the electrochemical insulating layer prevents or eliminates electrochemical interactions between a cold or thermal sprayed metal and one or more components of the FRP composite. In one aspect, the electrochemical insulating layer prevents or eliminates electrochemical interactions between a cold or thermal sprayed metal and carbon fibers of the FRP composite.

As used herein, the term "surface" means a surface located on a particular side of an article. A side of an article may include various surfaces or surface areas, including, but not limited to, a polymer article surface area or joint surface area, etc. Thus, when reciting a coating or layer is applied to a "surface" of a polymer or an article made therefrom, it is intended that such surface can comprise any one or all of the surfaces or surface areas located on that particular side of the polymer being coated.

Polymer Material or Substrate

Examples of polymer materials that can be used (e.g., as a substrate) that undergoes surface coating with a metallic coating or layer in accordance with the present disclosure include polymer materials that act as a matrix in combination with one or more types of fibers. In one example, materials useful for the practice of the present disclosure include fiber-reinforced plastics (FRP) comprising a polymer material in combination with an inorganic fibers such as fibers of carbon, carbon nanotubes, graphite, fiberglass, glass, metals, metal alloys, or metalized fibers and metal coated glass fibers, alumina fiber or boron fiber. In another example, the fiber reinforced plastic can comprise organic fiber such as a nylon fiber, or aramid fiber. In a further example, the fiber reinforced plastic can comprise organic fiber and/or inorganic fiber blended into a thermosetting or epoxy.

In one example, a carbon fiber reinforced plastic (CFRP) or glass fiber reinforced plastic (GFRP) as the polymer article made therefrom is imparted with lightning resistance and/or electromagnetic interference protection and/or electrochemical interaction protection suitable for aircraft structures or the like. However, the present disclosure is not restricted to these types of materials, and articles formed from other polymers can also be used in the presently disclosed process of the present disclosure.

For example, the polymer substrate of the CFRP can comprise a crystalline polymer. Crystalline polymers provide high temperature resistance as well as chemical resistance to FRPs. In another example, the polymer substrate of the CFRP comprises a semi-crystalline polymer. Semi-crystalline polymers provide the benefits of crystalline polymers along with ductility and processing advantages to FRPs. In yet another example, the polymer substrate comprises an amorphous polymer. Amorphous polymers provide for resiliency, ductility and processing advantages to FRPs.

The CFRP polymer substrate is selected from epoxies, phenolics, polyesters, polyesters, ureas, melamines, polyamides, polyimides, poly-ether-ether-ketones (PEEK), poly-ether-ketone-ketone (PEKK), polyetherimide (PEI), polyphthalamide, polyphtalates, polysulfone, polyurethanes, chlorinated polymers, fluorinated polymers, polytetrafluoroethylene, polycarbonates, liquid crystal polymers, partially crystalline aromatic polyesters, and modified versions thereof containing one or more fillers or reinforcement materials selected from carbon, carbon nanotubes, graphite, carbon fibers, graphite fibers, fiberglass, glass fibers, metals, metal alloys, metalized fibers and metal coated glass fibers.

Electrochemical Insulating Layer

In one or more of the previous examples described above, an electrochemical insulating layer is provided between the polymer substrate surface and the cold spray deposited metallic coating or layer. Exemplary electrochemical insulating layer materials include non-conductive materials, such as fiberglass, polymers, and ceramics. Exemplary electrochemical insulating layer materials include, but are not limited to: non-conductive polymers (e.g., PEEK or PEKK) with or without fillers; nonconductive fiber-impregnated fabrics, polymers, and thermosets; or other coatings containing nonconductive fiber-reinforcing materials. In one example the electrochemical insulating layer is impregnated fiberglass ($Si_xO_y$). In another example the electrochemical insulating layer is a metal-metal oxide composite such as aluminum-aluminum oxide (Al—$Al_2O_3$), or is titanium oxide ($TiO_2$), silicon oxy carbide ($SiO_xC_y$) and the like. In another example, the electrochemical insulating layer is a cemented carbide alloy, such as tungsten carbide cobalt nickel alloy (WC—Co—Ni). In one aspect, the electrochemical insulating layer can be applied to the polymer surface using, for example, chemical vapor deposition, atmospheric plasma deposition, metal melt deposition, or by way of curable glass fiber or other nonconductive fiber-reinforced thermosets, paints, or coatings.

Additional or Second Metallic Coating or Layer

In some examples, the present disclosure further comprises introducing an optional additional or second metallic coating or layer to at least a portion of a first cold sprayed metallic coating present on the polymer substrate surface. In one example, the second metallic layer is of a different metallic composition than that of the first cold sprayed metallic coating present on the polymer substrate surface. For example, the second metallic layer is cold or thermal sprayed on at least a portion of the cold sprayed first metallic coating present on the polymer substrate surface. In another example, the second metallic layer is cold or thermal sprayed on at least a portion of the cold sprayed first metallic coating present on the electrochemical insulating layer present on the polymer substrate surface. In one aspect, the second metallic layer can be applied using, for example, chemical vapor deposition, atmospheric plasma deposition, and metal melt deposition.

The additional conductive layer can be or is selected from Ag, Au, Co, Cr, Cu, Fe, Ni, Mo, Pd, Pt, Rh, Ru, Sn, Ti, W, Zn, Zr, and alloys thereof. In one or more examples in combination with the above examples, the additional conductive layer comprises cold or thermal sprayed nickel. In some examples, the additional conductive layer comprises cold or thermal sprayed nickel on a cold sprayed aluminum coating on a carbon fiber reinforced plastic (CFRP) or glass fiber reinforced plastic (GFRP). In another example, the additional conductive layer comprises cold or thermal sprayed nickel on a cold sprayed aluminum coating on a carbon fiber or glass fiber reinforced poly-ether-ether-ketone (PEEK) or poly-ether-ketone-ketone (PEKK).

The polymer to be cold sprayed can be subjected to a pretreatment to facilitate formation of the metallic coating or the insulating layer on the polymer surface, for example, by roughening the surface of the polymer to provide an irregular surface topography. An irregular surface topography can result from various surface pretreatment methods, such as mechanical abrasion and etching. Such surface irregularities can contribute to a surface texture that influences bond strength between the metallic layer or insulating layer and the substrate surface. Suitable examples of roughening the surface of the polymer include fine particle shot blasting where such fine particles can be such as metals, ceramics and glass. The particles used in the shot blasting can be substantially spherical or contain edges. Other surface roughening methods may be used as known in the art.

In some examples, following completion of this optional surface roughness pretreatment, which may be used as required to roughen the surface of the polymer, or insulating layer, metallic particles are projected onto the surface of the polymer using a cold spraying method, so as to form a metallic coating thereon. In another example, the cold sprayed metal layer conforms to the original surface roughness of the polymer surface, making the metal coated polymer applied to the polymer surface amenable to painting and other fabrication. In another example, the cold sprayed metal layer is used in thermoplastic composite materials which are otherwise difficult to paint due to poor adhesion of paints to the surfaces of thermoplastic composite materials. The cold sprayed metal layer conforms to the original surface roughness of the thermoplastic composite surface, making the metal coated polymer applied to the thermoplastic composite surface amenable to painting and other fabrication.

The cold spraying method is a technique in which metallic particles are heated to a temperature that is lower than the melting point or softening point of the metallic particles, and are then sprayed using a propellant gas, thereby causing the metallic particles to impinge into the substrate in a solid state, forming a coating or layer. Provided the collision velocity of the cold sprayed particles is greater than a certain fixed velocity (the critical velocity), the kinetic energy of the particles causes the particles to undergo a plastic deformation, enabling formation of the coating to start. This critical velocity varies depending on the metal or alloy used for the particles and the glass transition temperature of the substrate, as well as the particle size. In the present disclosure, the spray pressure of the above propellant gas is selected so that the collision velocity of the metal particles striking the polymer reaches a critical velocity associated with the metal used and the polymer substrate, and is typically set to a value of between about 100 about 400 psi.

The heating temperature of the propellant gas comprising the metal particles is usually selected appropriately in accordance with the materials being used, and is typically set to a value of about 100° C. and not more than 500° C. In one example, the gas flow uses a gas having a pressure of from between about 100 psi and about 400 psi, so as to provide a temperature below the melting point of the metallic particles. In some examples the temperature is between about 100° C. to about 500° C. These conditions provide for efficient acceleration of the metallic particles, and reduces thermal and chemical effects of the substrate surface.

Readily available air or nitrogen can be used as the gas for forming a gas stream to reduce oxidative effects and reduce cost. The air or nitrogen makes it possible to regulate the velocity of metallic particles within a range of subsonic to supersonic velocity, e.g. from 300 to 1200 m/s. Controlling the velocity of particles can be achieved by heating the gas and also provides for regulation of the velocity of particles within wide limits.

An apparatus for carrying out the method for applying a coating can comprise a metering powder feeder having a casing incorporating a hopper for containing the metallic particles. In one example the hopper is formed as a drum having depressions in its cylindrical surface for metering the metallic particles and presenting the powder to a mixing chamber provided with a nozzle configured for accelerating the metallic particles. A source of compressed gas is connected to the mixing chamber. A metallic particle flow controller is operably connected to the cylindrical surface of the drum, providing a space that results in a desired flowrate of the particles. An intermediate nozzle can be connected to the mixing chamber that communicates, via an inlet pipe, with the source of compressed gas. In one example a CenterLine (Windsor) Limited system (Ontario, Canada), with robotics, is used as the cold spray apparatus.

The presently disclosed method provides for applying a conductive, metallic coating or layer to the surface of a polymer, such as a FRP. The particles are of a size of from 1 to 50 microns in an amount so as to provide a density of mass flow rate of the particles suitable for providing a continuous, non-continuous, or patterned metallic coating on the substrate surface that is dense, and of a low volume of microvoids to optimize conductivity of the coating. The resultant metallic coating or layer is uniform, without phase transformations, and generally conformal to the surface roughness of the substrate. The resultant metallic coatings or layers do not crack, have metal like microhardness, and display excellent cohesive and adhesive strength. A particle size of less than 1 micron is undesirable, as a stable spray state may not be achievable. If the particle size exceeds 50 micron, then uniform deposition of the particles becomes problematic.

In the present disclosure, comparatively soft metal particles (Mohs Hardness <4) can be used as the coating material particles. Examples of the types of comparatively soft metal particles that can be used include copper, gold, silver, aluminum or aluminum alloy particles that exhibit adhesion to polymers such as FRPs. In one example, cold spraying using aluminum or aluminum alloy particles is used as the base coating or layer on the FRP substrate.

Using the process described above, a metallic coating is formed on at least a portion of the surface of the polymer, thereby imparting electrical EMI resistance or lightning protection, electromagnetic interference shielding, electromagnetic emission shielding, or lightning strike protection to the surface of the polymer, and/or electrochemical interaction prevention between the polymer and the spray coated metal.

In a polymer with surface EMI resistance or lightning protection obtained in this manner, the thickness of the metallic coating can be from 1 mils (25.4 microns) to 14 mils (356 microns). Where the polymer with surface electrical EMI resistance or lightning protection, electromagnetic interference shielding, electromagnetic emission shielding, or lightning strike protection is used as an aircraft main wing structure that exhibits lightning resistance, the thickness of the metallic coating, in one example is, but not limited to, not less than 1 mils (25.4 microns) and not more than 10 mils (254 microns), e.g., so as to not contribute to the weight of the structure.

The metallic coating can be formed from a single layer, or can be formed by depositing two or more layers together. In the case of a two-layer coating, aluminum or nickel, either of which exhibits excellent adhesion to a variety of FRPs, can be used for forming the layer closest to the substrate of the polymer. In one example, forming a layer of aluminum closest to the substrate surface of the polymer is performed. In one example, so as to provide an acceptable level of EMI resistance or lightning protection in combination with electrochemical resistance between the metal and polymer, a layer of aluminum is sprayed closest to the substrate of the polymer followed by a sprayed layer of nickel.

Figure 1:
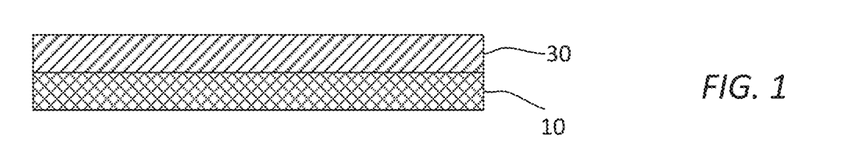
FIG. 1 depicts a cross-sectional view of a polymer surface having a metallic coating providing electromagnetic interference shielding, electromagnetic emission shielding, or lightning strike protection obtained using the presently disclosed process.

With reference to FIG. 1, which shows a cross-sectional view of a polymer surface having a metallic coating providing electromagnetic interference shielding, electromagnetic emission shielding, or lightning strike protection prepared in accordance with the present disclosure, whereby polymer substrate 10 comprises metallic coating or layer 30. Polymer substrate 10 can be an epoxy, phenolic, polyester, polyester, urea, melamine, polyamide, polyimides, poly-ether-ether-ketones (PEEK), poly-ether-ketone-ketone (PEKK), polyphthalamide, polyphtalates, polysulfone, polyurethanes, chlorinated polymers, fluorinated polymers, polytetrafluoroethylene, polycarbonates, liquid crystal polymers, partially crystalline aromatic polyesters, and modified versions thereof. Polymer substrate 10 can be one of the polymers listed above containing one or more fillers or reinforcement materials (e.g., a thermoplastic composite) comprising carbon, carbon nanotubes, graphite, carbon fibers, graphite fibers, fiberglass, glass fibers, metals, metal alloys, metalized fibers and metal coated glass fibers. Metallic coating or layer 30 in one example is aluminum or an aluminum alloy. In one example, the polymer substrate 10 is carbon fiber or glass fiber reinforced PEKK or carbon fiber or glass fiber reinforced PEEK and the metallic coating or layer 30 is aluminum. Polymer substrate 10, e.g., a thermoplastic composite, comprising metallic coating or layer 30 can be painted (not shown) with improved adhesion of the paint to the thermoplastic composite in part due to the metallic coating or layer.

Figure 2:
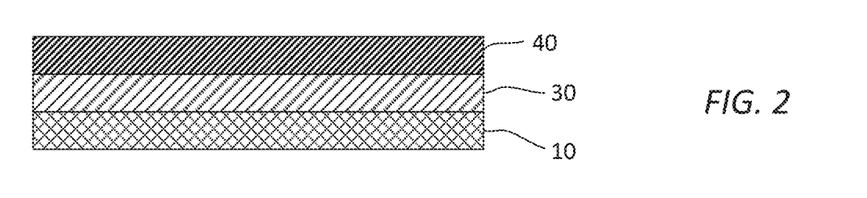
FIG. 2 depicts a cross-sectional view of a polymer surface having a first metallic coating, a coating and a second metal providing electromagnetic interference shielding, electromagnetic emission shielding, or lightning strike protection obtained using the presently disclosed process.

With reference to FIG. 2 which shows a cross-sectional view of a polymer substrate 10 having a first metallic coating or layer 30 and second metallic coating or layer 40, providing electromagnetic interference shielding, electromagnetic emission shielding, or lightning strike protection prepared in accordance with the present disclosure. First metallic coating or layer 30 in one example is aluminum or an aluminum alloy and second metallic coating or layer 40 is nickel. In one example, the polymer substrate 10 is carbon fiber or glass fiber reinforced PEKK or carbon fiber or glass fiber reinforced PEEK and the first metallic coating or layer 30 is aluminum and the second metallic coating or layer 40 is nickel.

Figure 3:
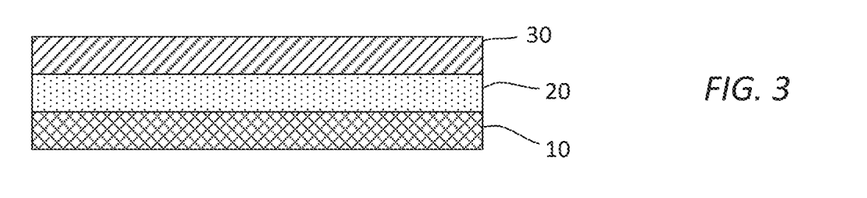
FIG. 3 depicts a cross-sectional view of a polymer surface having an electrochemical insulating layer and metallic coating providing electromagnetic interference shielding, electromagnetic emission shielding, or lightning strike protection as well as resistance to electrochemical interactions between the first metal and the carbon fibers, obtained using the presently disclosed process.

With reference to FIG. 3 which shows a cross-sectional view of a polymer substrate 10 having an electrochemical insulating layer 20 and metallic coating or layer 30 providing electromagnetic interference shielding, electromagnetic emission shielding, or lightning strike protection, as well as resistance to electrochemical interactions between the metallic coating or layer 30 and the polymer substrate 10, obtained using the presently disclosed process. In one example, the polymer substrate 10 is carbon fiber or glass fiber reinforced PEKK or carbon fiber or glass fiber reinforced PEEK, the electrochemical insulating layer 20 is a fiberglass (or curable glass fiber reinforced thermoset), or paint, and the metallic coating or layer 30 is aluminum.

Figure 4:
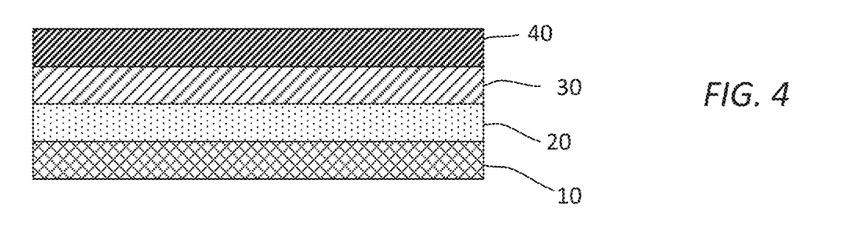
FIG. 4 depicts a cross-sectional view of a polymer surface having an electrochemical insulating layer, a metallic coating of a first metal, and a coating of a second metal providing electromagnetic interference shielding, electromagnetic emission shielding, or lightning strike protection as well as resistance to electrochemical interactions between the first metal and the polymer, obtained using the presently disclosed process.

With reference to FIG. 4 which shows a cross-sectional view of a polymer substrate 10 having an electrochemical insulating layer 20 and a first metallic coating or layer 30, and a second metallic coating or layer 40 providing electromagnetic interference shielding, electromagnetic emission shielding, or lightning strike protection as well as resistance to electrochemical interactions between the first metallic coating or layer 30 and the polymer substrate 10, obtained using the presently disclosed process. In one example, the polymer substrate 10 is fiber reinforced PEKK or fiber reinforced PEEK, electrochemical insulating layer 20 is a fiberglass, the first metallic coating or layer 30 is aluminum, and the second metallic coating or layer 40 is nickel. In one example, the polymer substrate 10 is carbon fiber or glass fiber reinforced PEKK or carbon fiber or glass fiber reinforced PEEK, the electrochemical insulating layer 20 is a fiberglass (or curable glass fiber reinforced thermoset), carbon or glass fiber fabric impregnated with epoxy, or nonconductive paint, the metallic coating or layer 30 is aluminum, and the second metallic coating or layer 40 is nickel.

Polymers, for example, polymers suitable for aerospace vehicles, are exposed to electromagnetic radiation and/or electromagnetic radiation in combination with low temperatures experienced during travel. The presently disclosed cold sprayed layer and/or ceramic/metal oxide layer further provides protection for polymers of composites and/or other organic components of the composite from electromagnetic radiation exposure. Examples of electromagnetic radiation include solar radiation, x-rays, UV, and visible light. The presently disclosed cold sprayed layer and/or ceramic/metal oxide layer provide protection from electromagnetic radiation exposure by absorbing and/or reflecting solar radiation, x-rays, UV, and visible light reducing or eliminating interaction with the polymeric material and other organic components of the composite. For example, the presently disclosed cold sprayed layer and/or ceramic/metal oxide layer provides electromagnetic radiation protection of composites comprising an epoxy, phenolic, polyester, polyester, urea, melamine, polyamide, polyimides, poly-ether-ether-ketones (PEEK), poly-ether-ketone-ketone (PEKK), polyphthalamide, polyphtalates, polysulfone, polyurethanes, chlorinated polymers, fluorinated polymers, polytetrafluoroethylene, polycarbonates, liquid crystal polymers, partially crystalline aromatic polyesters, and modified versions thereof. In one example, the presently disclosed cold sprayed layer and/or ceramic/metal oxide layer provides electromagnetic radiation protection of fiber reinforced PEKK or fiber reinforced PEEK. In another example, the presently disclosed cold sprayed layer and/or ceramic/metal oxide layer provides electromagnetic radiation protection of fiber reinforced PEKK or fiber reinforced PEEK with an electrochemical insulating layer of fiberglass. In another example a first metallic coating or layer of aluminum and a second metallic coating or layer of nickel provides electromagnetic radiation protection of the above composite polymer materials, such as for example, fiber reinforced PEKK or fiber reinforced PEEK with or without an electrochemical insulating layer of fiberglass.

The present disclosure is described in more detail below using a series of examples.

EXAMPLES

Metallic particles: aluminum particles, average particle size of 40 micron. Spraying conditions: CenterLine (Windsor) Limited system cold spray coating apparatus, with robotics spray pressure 100-400 psi, gas heating temperature 100° C.-500° C. Gas: air or nitrogen.

A carbon fiber reinforced plastic (CFRP) was evaluated, exemplified as carbon fiber or glass fiber reinforced PEKK, was subjected to a cold spraying treatment under the conditions described below in Table 1, thereby imparting electrical EMI resistance or lightning protection, electromagnetic interference shielding, electromagnetic emission shielding, or lightning strike protection to the surface of the polymer test samples 2-5.

An electrochemical insulating layer is applied to a surface of the FRP receiving the cold spray metal coating so as to further provide protection against galvanic or other electrochemical interactions between one or more of the FRP constituents and the cold spray coated metal. For example, a thermoplastic or thermoset prepeg of the FRP (e.g., carbon fiber pre-impregnated with PEEK or PEKK thermoplastic as a tape, woven or stitched fabric, or as carbon fiber pre-impregnated with a curable resin such as an epoxy, e.g., a B-Stage product) can be laid up with a sheet or film of the electrochemical insulating layer, e.g., a PEEK or PEKK polymer and consolidated, thermoformed or molded so as to provide the electrochemical insulating layer-coated FRP suitable for cold spray metal coating.

Figure 5:
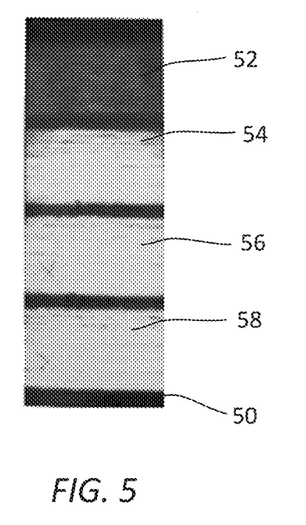
FIG. 5 depicts photographic experimental results of the cold spray metal deposition obtained using the presently disclosed process.
Figure 6:
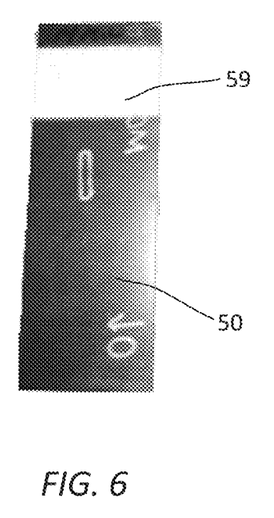
FIG. 6 depicts photographic experimental results of the cold spray metal deposition obtained using the presently disclosed process.

As summarized in Table 1, temperature and pressure conditions as well as coating thicknesses were obtained with test samples 3-5 that showed acceptable tape adhesion and scratch resistance. FIGS. 5 and 6 depict photographic images of the test samples 1-5 on the PEKK substrate 50. With reference to FIG. 5, test sample 1 indicated as 52 is the control, test sample 2 is indicated as 54, test sample 3 is indicated as 56, test sample 4 is indicated as 58. Test sample 5 is indicated as 59 in FIG. 6.

Figure 7:
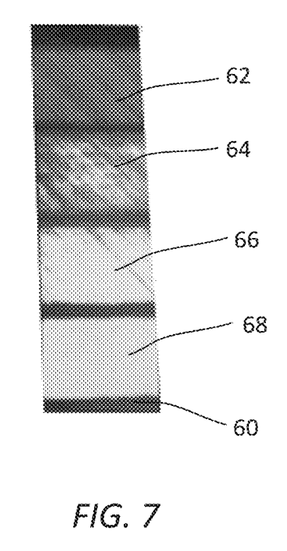
FIG. 7 depicts photographic experimental results of the cold spray metal deposition obtained using the presently disclosed process.

An additional carbon fiber reinforced plastic (CFRP) sample was evaluated, exemplified as carbon fiber or glass fiber reinforced PEKK subjected to a cold spraying treatment under the conditions described below in Table 2. As summarized in Table 2, temperature and pressure conditions as well as coating thicknesses were obtained with test samples 9-10 that showed acceptable tape adhesion. FIG. 7 depicts photographic images of the test samples 7-10 on the PEKK substrate 60. With reference to FIG. 7, test sample 7 is indicated as 62, test sample 8 is indicated as 64, test sample 9 is indicated as 66, and test sample 10 is indicated as 68.

The fiber reinforced plastics described above are amenable to an electrochemical insulating layer deposition treatment as well as a 2-stage cold spraying treatment under the conditions described in Tables 1 and 2, thereby imparting electrical EMI resistance or lightning protection, electromagnetic interference shielding, electromagnetic emission shielding, or lightning strike protection as well as galvanic and electrochemical interaction resistance between the cold sprayed metal and the polymer.

TABLE 1

Composite #2 (PEKK) cold spray conditions

| Test | Passes | Temperature (° C.) | Pressure (PSI) | Thickness (mils) | Tape Adhesion | Scratch |
|---|---|---|---|---|---|---|
| 1 | 1 | 350 | 100 | 0 | N/A | |
| 2 | 1 | 350 | 150 | 3 | Pass | |
| 3 | 1 | 350 | 200 | 5 | Pass | Pass |
| 4 | 1 | 350 | 250 | 5 | Pass | Pass |
| 5 | 4 | 350 | 200 | 14 | Pass | Pass |

TABLE 2

Composite #2 (PEKK) cold spray conditions

| Test | Passes | Temperature (° C.) | Pressure (PSI) | Thickness (mils) | Tape Adhesion |
|---|---|---|---|---|---|
| 7 | 1 | 150 | 200 | | |
| 8 | 1 | 200-250 | 200 | | |
| 9 | 1 | 300 | 200 | 1.5 | Pass |
| 10 | 1 | 350 | 200 | 3 | Pass |

Figure 8:
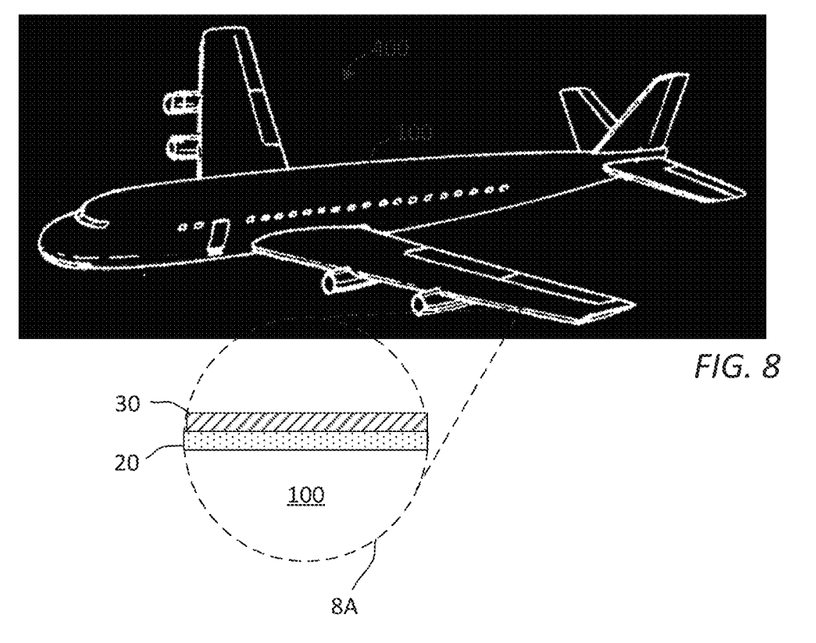
FIG. 8 depicts an application of the electrochemical insulating layer and cold sprayed metallic layer applied to an aerospace vehicle.

With reference to FIG. 8, an application of the presently disclosed method is shown on an aerospace vehicle 400, whereby vehicle substrate surface 100 comprised of FRP is subjected to the presently disclosed method. Exploded view 8A is shown having vehicle substrate surface 100 with electrochemical insulating layer 20 and metallic coating or layer 30 so as to impart electrical EMI resistance or lightning protection, electromagnetic interference shielding, electromagnetic emission shielding, or lightning strike protection to the surface of the polymer as well as galvanic and electrochemical interaction resistance between the cold sprayed metal and the FRP. In one example the application of the presently disclosed method is directed to an external surface of aerospace vehicle 400.

Figure 9:
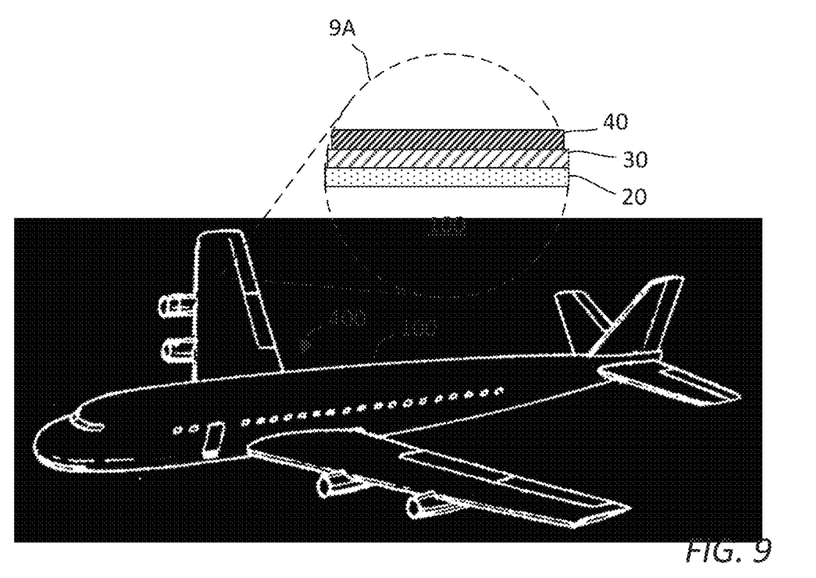
FIG. 9 depicts an application of the electrochemical insulating layer, cold sprayed metallic layer, and an additional metallic layer applied to an aerospace vehicle.

With reference to FIG. 9, an additional application of the presently disclosed method is shown on aerospace vehicle 400, whereby vehicle substrate surface 100 comprised of FRP, is subjected to the presently disclosed method. Exploded view 9A is shown having vehicle substrate surface 100 with electrochemical insulating layer 20 and first metallic coating or layer 30 and second metallic coating 40 so as to provide imparting EMI resistance or lightning protection, electromagnetic interference shielding, electromagnetic emission shielding, or lightning strike protection to the surface of the polymer as well as galvanic and electrochemical interaction resistance between the cold sprayed metal and the FRP.

Figure 10A:
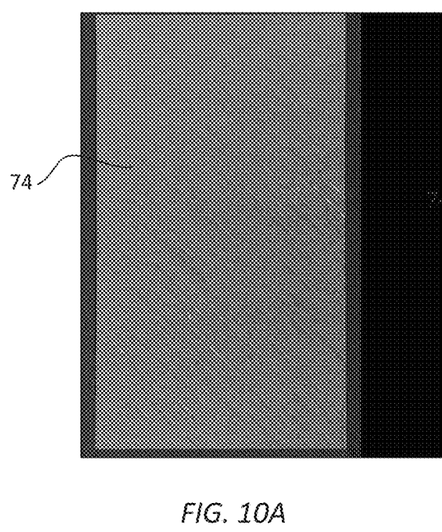
FIGS. 10A and 10B depict digital images of aluminum cold spray metal deposition test samples, un-scribed and scribed, respectively.
Figure 10B:
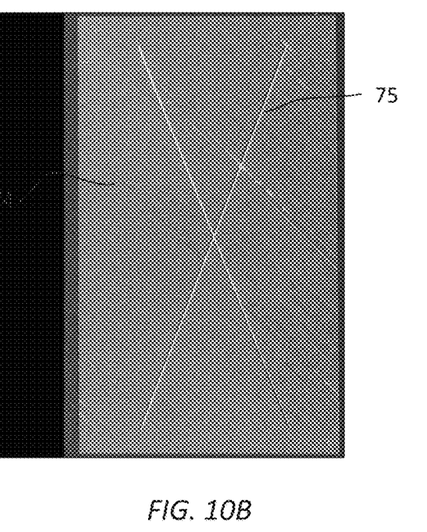
Figure 11A:
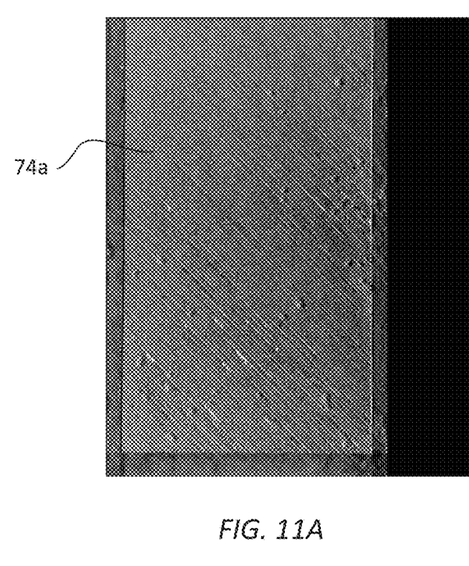
FIGS. 11A and 11B depict digital images of the aluminum un-scribed and scribed samples, respectively, after ASTM B 117 testing.
Figure 11B:
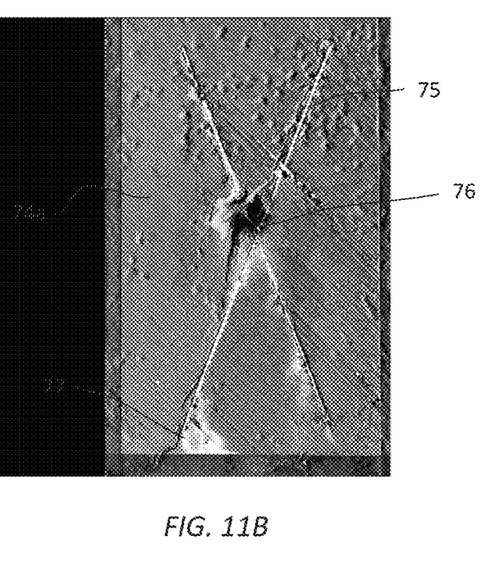

With reference to FIGS. 10A and 10B, digital images of aluminum cold spray metal deposition test control samples without fiberglass having un-scribed surface 74 and surface 74 with scribes 75, respectively, are shown on a composite PEKK from Cytec Solvay. These controls were pretreated with Iridite 14-2 (chromate conversion film; MacDermid, Waterbury, CT). These samples were subjected to salt fog testing for 168 hours as per ASTM B 117 (2018). FIGS. 11A and 11B depict digital images of the aluminum un-scribed surface 74a and scribed surface 74a of the control samples, respectively, after ASTM B 117 salt fog testing for 168 hours and 500 hours. As can be seen from FIGS. 11A and 11B, significant corrosion 76, 77 has occurred due to breach of the surface and electrochemical interactions between the composite and the subsequently deposited aluminum layer.

Figure 12:
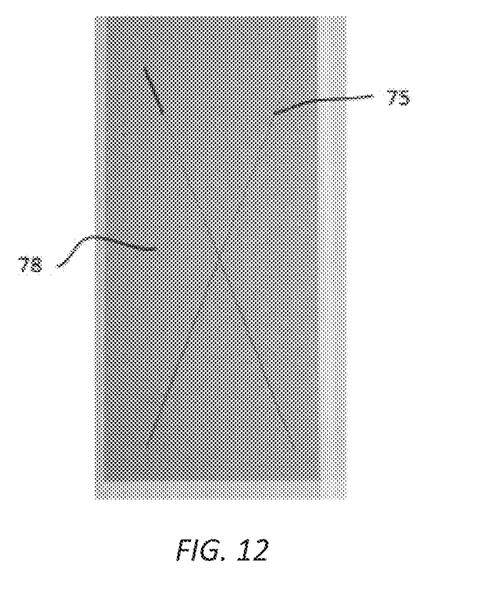
FIG. 12 depicts a digital image of aluminum cold spray metal deposition on a scribed PEKK/electrochemical insulating layer sample using the presently disclosed compositions and process.
Figure 13:
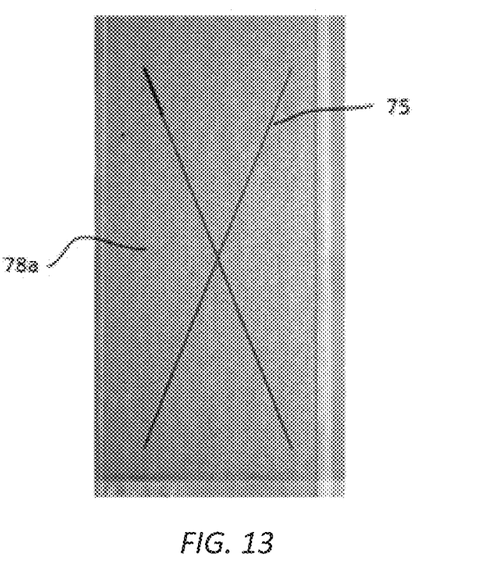
FIG. 13 depicts a digital image of the aluminum cold spray metal deposition on PEKK/electrochemical insulating layer samples, respectively, after ASTM B 117 testing, using the presently disclosed compositions and process.

FIG. 12 depicts a digital image of aluminum cold spray metal deposition on PEKK/electrochemical insulating layer samples with surface 78 and surface 78 with scribes 75, using the presently disclosed composition of PEKK/fiberglass and presently disclosed process. The sample was pretreated with Iridite 14-2 (chromate conversion film; MacDermid, Waterbury, CT). As can be seen from FIG. 13, which depicts a digital image of the sample depicted in FIG. 12 after ASTM B 117 salt fog testing for 168 hours. ASTM B 117 salt fog testing of the sample shown in FIG. 13 was continued out to 500 hours with no observed corrosion. The presently disclosed methods and compositions provide superior corrosion resistance by virtue of having an electrochemical insulating layer that reduces or eliminates electrochemical interactions between one or more of the components of the composite layer and the deposited aluminum layer.

Painting Cold Sprayed Thermoplastic Composites

Thermoplastic composite test panels were cold sprayed with aluminum and then painted. Typically, painting and other coating processes in thermoplastic composites fail because of poor adhesion of the paint or coating to the surface of the thermoplastic composite. In contrast, thermoplastic composite test panels cold spray coated with aluminum were successfully painted and provided adhesion of primer and topcoat superior to a substrate painted without the cold spray coated layer.

Panels of fiberglass reinforced PEKK were cold sprayed using 350° C. nozzle temperature, 200 psi (1.4 MPa) of pressure (air), travel speed of 100 mm/sec, with 2 mm steps. The cold sprayed panels were burnished using #10 glass beads at 15% feed rate, 25° C. nozzle temperature, and air pressure at 55 psi, (379 KPa) before being treated with Iridite 14-2 (chromate conversion film; MacDermid, Waterbury, CT). The panels were then painted with primer and then a polyurethane topcoat (Desothane CA8000/B70846; PP Aerospace, Sylmar, CA). Control panels of only fiberglass reinforced PEKK thermoplastic composite demonstrated poor adhesion to the primer and/or polyurethane topcoat. In contrast, dry and wet crosshatch adhesion, pre- and post-testing, demonstrated ratings of 10 for dry crosshatch adhesion and 9 for wet crosshatch adhesion for the fiberglass reinforced PEKK thermoplastic composite having a spray coated metal layer (e.g., aluminum) between the thermoplastic composite and the paint. Thus, the presently disclosed compositions and methods provide for painting and/or coating of thermoplastic composite substrates via the introduction of a cold sprayed metal layer on the surface of the thermoplastic composite.

We claim:

1. A method of reducing or eliminating at least one electrochemical interaction between a metallic coating and a polymer in a formed article, the method comprising:
   introducing particles of a metal powder or metal alloy powder or a mixture of the metal powder and the metal alloy powder to a gas stream;
   directing the gas stream toward an electrochemical insulating layer present on a surface of a polymer, wherein the gas stream has a temperature and a pressure adjusted to prevent thermal softening or ablation of the surface of the electrochemical insulating layer;
   forming a metallic coating on at least a portion of the electrochemical insulating layer;
   reducing or eliminating electrochemical interaction between the metallic coating and the polymer; and
   introducing an additional metallic layer comprising niobium on at least a portion of the metallic coating using a cold spray process;
   wherein the metal powder or the metal alloy powder comprises copper; and
   wherein the metallic coating imparts electrical EMI resistance or lightning protection to the formed article.

2. The method of claim 1, wherein the metal powder or metal alloy powder further comprises aluminum.

3. The method of claim 1, wherein the metal powder or metal alloy powder further comprises Al, Ag, Au, Co, Cr, Cu, Fe, Ni, Mo, Pd, Pt, Rh, Ru, Sn, Ti, W, Zn, Zr, or alloys thereof.

4. The method of claim 3, wherein the metal powder or metal alloy powder further comprises aluminum, copper, gold, silver, or a combination thereof.

5. The method of claim 1, wherein the metallic coating is configured to receive paint or a coating.

6. The method of claim 1, the additional metallic layer being compositionally different from the metallic coating.

7. The method of claim 1, wherein the additional metallic layer is selected from Ag, Au, Co, Cr, Cu, Fe, Ni, Mo, Pd, Pt, Rh, Ru, Sn, Ti, W, Zn, Zr, or alloys thereof.

8. The method of claim 1, wherein the additional metallic layer further comprises thermal sprayed metal.

9. The method of claim 1, wherein the wherein the metallic coating has a surface roughness configured to be coatable or paintable and the electrochemical insulating layer is a coating or a paint.

10. The method of claim 1, wherein the formed article is a component or part of an aerospace vehicle.

11. The method of claim 1, wherein at least a portion of the electrochemical insulating layer comprises a non-conductive polymer, a cemented carbide alloy, a metal-metal oxide composite, or a combination thereof.

12. A method of reducing or eliminating at least one electrochemical interaction between a metallic coating and a polymer in a formed article, the method comprising:
   introducing particles of a metal powder or metal alloy powder or a mixture of the metal powder and the metal alloy powder to a gas stream;
   directing the gas stream toward an electrochemical insulating layer present on a surface of a polymer, wherein the gas stream has a temperature and a pressure adjusted to prevent thermal softening or ablation of the surface of the electrochemical insulating layer;
   forming a metallic coating on at least a portion of the electrochemical insulating layer; and
   reducing or eliminating electrochemical interaction between the metallic coating and the polymer; and
   introducing an additional metallic layer comprising niobium on at least a portion of the metallic coating using a cold spray process;
   wherein the metal powder or the metal alloy powder comprise aluminum, copper, gold, silver, or a combination thereof;
   wherein the metallic coating has a surface roughness configured to be coatable or paintable; and
   wherein the metallic coating imparts electrical EMI resistance or lightning protection to the formed article.

13. The method of claim 12, wherein the metal alloy powder further comprises aluminum.

14. The method of claim 12, wherein the metal alloy powder further comprises Al, Ag, Au, Co, Cr, Cu, Fe, Ni, Mo, Pd, Pt, Rh, Ru, Sn, Ti, W, Zn, Zr, or alloys thereof.

15. The method of claim 12, wherein the metal alloy powder further comprises aluminum, copper, gold, silver, or a combination thereof.

16. The method of claim 12, wherein at least a portion of the electrochemical insulating layer comprises a coating, a paint, a non-conductive polymer, a cemented carbide alloy, a metal-metal oxide composite, or a combination thereof.

17. The method of claim 12, wherein at least a portion of the polymer comprises carbon or glass reinforced PEKK or PEEK.

18. A method of reducing or eliminating at least one electrochemical interaction between a metallic coating and a polymer in a formed article, the method comprising:
  introducing particles of a metal alloy powder to a gas stream;
  directing the gas stream toward an electrochemical insulating layer present on a surface of a polymer, wherein the gas stream has a temperature and a pressure adjusted to prevent thermal softening or ablation of the surface of the electrochemical insulating layer;
  forming a metallic coating on at least a portion of the electrochemical insulating layer;
  reducing or eliminating electrochemical interaction between the metallic coating and the polymer; and
  further comprising introducing an additional metallic layer comprising a cold sprayed metal comprising niobium on at least a portion of the metallic coating,
  wherein the metal alloy powder comprises aluminum, copper, gold, silver, or a combination thereof;
  wherein the metallic coating has a surface roughness configured to be coatable or paintable; and
  wherein the metallic coating imparts electrical EMI resistance or lightning protection to the formed article.

19. The method of claim 18, wherein at least a portion of the electrochemical insulating layer comprises a paint, a non-conductive polymer, a cemented carbide alloy, a metal-metal oxide composite, or a combination thereof.

20. The method of claim 18, wherein at least a portion of the polymer comprises carbon or glass reinforced PEKK or PEEK.

* * * * *